Figure 1:
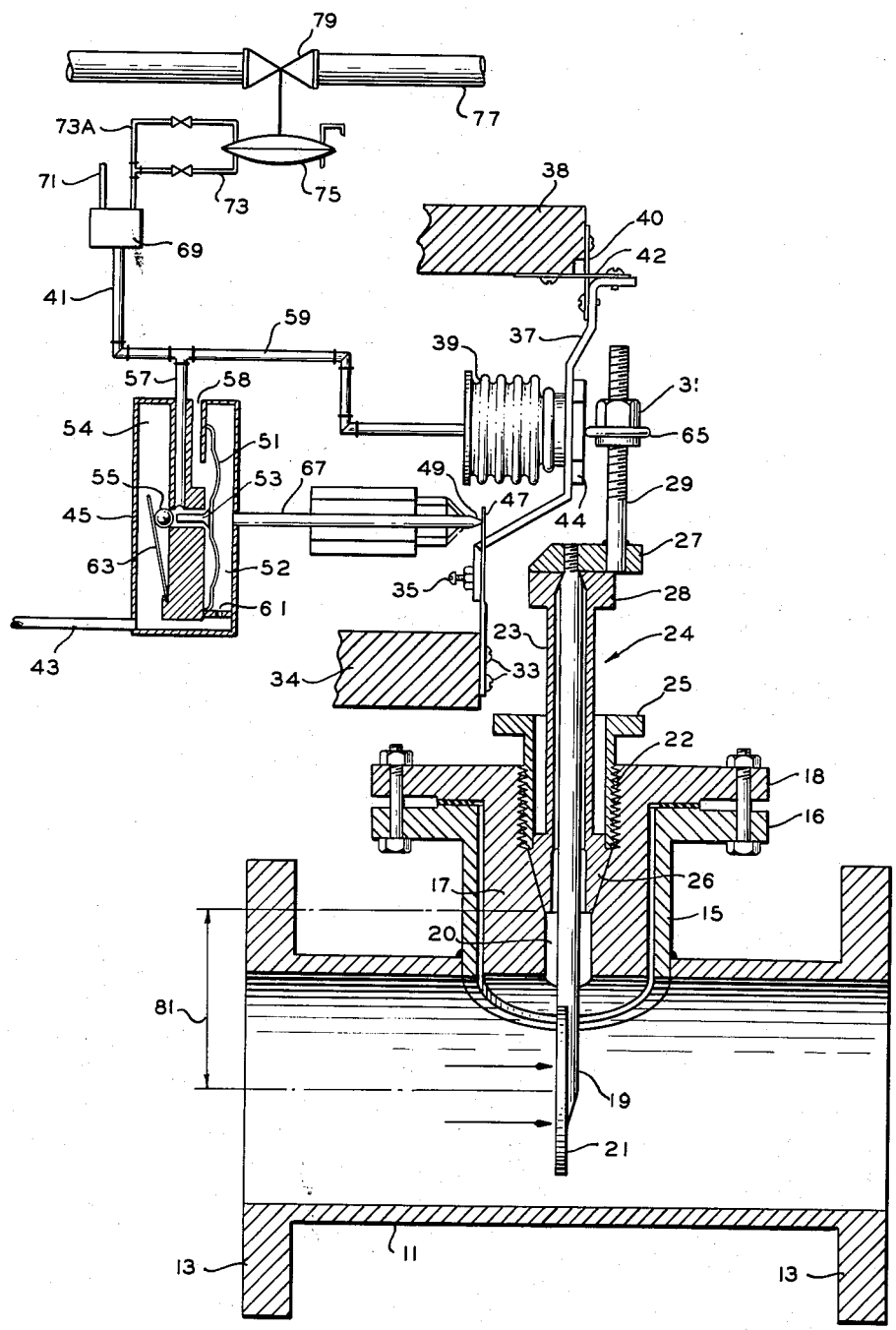

April 24, 1956 J. C. BROUS 2,742,784
FLOW METER
Filed Dec. 29, 1952 2 Sheets-Sheet 1

INVENTOR.
J. C. BROUS
BY *Hudson & Young*
ATTORNEYS

April 24, 1956 J. C. BROUS 2,742,784
FLOW METER
Filed Dec. 29, 1952 2 Sheets-Sheet 2

INVENTOR.
J.C. BROUS
BY *Hudson & Young*
ATTORNEYS

United States Patent Office 2,742,784
Patented Apr. 24, 1956

2,742,784
FLOW METER

Jack C. Brous, Kansas City, Kans., assignor to Phillips Petroleum Company, a corporation of Delaware Application December 29, 1952, Serial No. 328,417

3 Claims. (Cl. 73—228)

This invention relates to flowmeters. In one aspect it relates to flowmeters for measuring the flow of fluids and fluids containing suspended solid materials.

One conventional method of measuring fluid flow is to insert an orifice plate having an opening of known diameter into a pipe provided with a pressure take-off conduit upstream and one downstream of the orifice. This pair of pipes or tubes may form the arms of a U-tube or may lead to a conventional differential pressure apparatus which indicates and/or records on a chart the difference in pressures between the two tubes in terms of fluid flow. This indicator apparatus may be combined with a controller adapted to control a process in response to an indicated pressure difference or rate of fluid flow.

Such flow controller apparatus is not ordinarily adapted to measuring the flow of heavy residual oils, catalyst slurries or the like.

According to my invention I use a circular plate disposed in the center of a pipe in place of the conventional orifice. This plate is attached to one end of a rod which in turn is attached to one end of a flexible tube assembly. The flow of materials against this plate is indicated by elastic deformation of this elastic tube. In this manner I am able to measure the flow of such materials as heavy residua, fuel oils, catalyst slurries, liquid phenols, propane-wax slurries, liquids with entrained solids and wet hydrocarbon gas, that is gas containing condensible hydrocarbon constituents.

One object of my invention is to provide a flowmeter apparatus adapted to measure fluid flow in conduits.

Another object of my invention is to provide a flowmeter apparatus adaptable for measuring flow of viscous fluids and fluids containing solid matter.

Still another object of my invention is to provide a flowmeter of the type that the entire pipe section will not need to be removed in order to change the size of the sensing element or to calibrate the meter.

Yet another object of my invention is to devise a flowmeter apparatus so that parts of apparatus for use in a pipe of one size can be used in pipes of other sizes without recalibration.

Yet another object of my invention is to devise a flowmeter assembly which is less expensive to construct, install and to maintain than those in common use.

These, and other objects and advantages of my invention will be realized upon reading the following description which, taken with the attached drawing, forms a part of this specification.

In the drawing, Figure 1 is a longitudinal section in diagrammatic form, of one embodiment of my invention.

Figure 2:
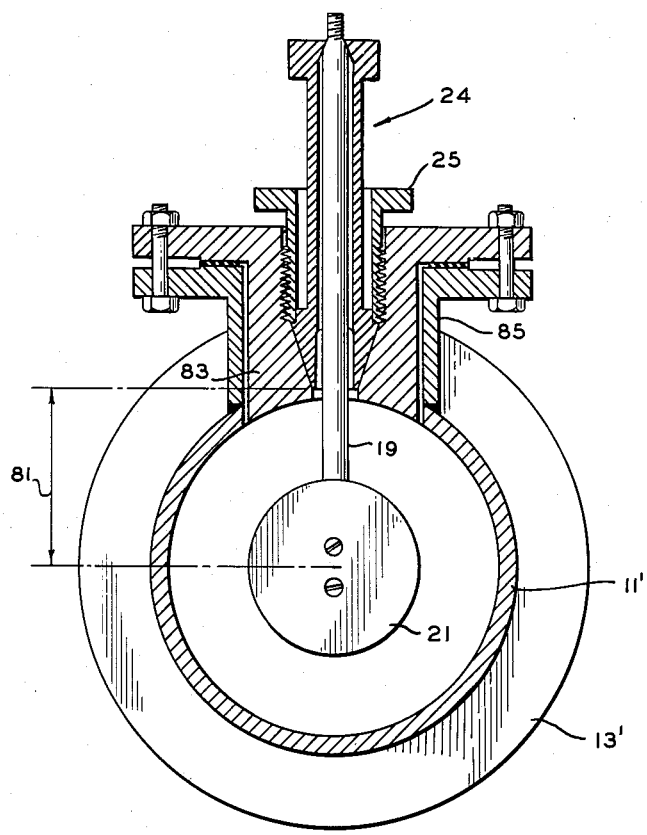

Figure 2 illustrates a cross-sectional view in diagrammatic form of another embodiment of my invention.

Referring now to Figure 1 of the drawing, reference numeral 11 identifies a section of pipe or a pipe T provided with a side extension 15. On either end of the pipe member 11 are flanges 13. The side extension outlet 15 is generally circular in cross-section and its axis is substantially perpendicular to the axis of the pipe member 11. This side outlet 15 is of sufficiently large diameter that a flow plate 21 of any desired diameter may be passed through for removal or installation. Element 15 is provided with a flange 16 as illustrated. A plug member 17 is fitted as shown into the element 15. The plug 17 is provided with a flange 18 which corresponds to the flange 16. By insertion of bolts through the holes in the flanges the plug member 17 may be held rigidly in its proper position within element 15. The plug member 17 is provided with an axial conduit, the upper portion of which is provided with threads 22. This upper threaded portion is slightly larger in diameter than the lower unthreaded portion. A flexure assembly 24 is held in place in conduit 20 of plug 17, as shown, by nut 25. The lower end 26 of flexure tube 23, is tapered as illustrated and fits tightly against a correspondingly tapered portion of conduit 20. Flexure tube 23 extends vertically and terminates in a plate 28. Attached to the top of this plate 28 is another plate 27. Plate 27 contains a threaded opening which is disposed in axial alignment with the tubing member 23. The inside diameter of the tube 23 is greater than the diameter of a rod 19 disposed axially therethrough. The upper end of this rod is threaded into the member 27. To the lower end of the rod 19 is attached circular disc 21. This circular disc 21 may be attached to the lower end of the rod 19 by any means desired, such as by screws or bolts. It is preferable that disc 21 be attached to the rod 19 in such a manner that it may be easily removed therefrom.

Into plate 27 is disposed a threaded rod 29 as shown. A nut 31 having a flange 65 around its periphery is disposed on this threaded rod.

A lever element 37 is hinged to support member 38 by flexible members 40 and 42. These flexible elements 40 and 42 may, if desired, be made of flat strips of, for example, spring steel, or the like. Thus, lever element 37 is free to rotate around the point defined by the hinge elements 40 and 42. A baffle member 47 is held by screws 33 to a support member 34. A bolt and lock nut assembly 35 is provided in the lever 37 for adjustment or positioning of the baffle member 47 with respect to the adjacent and open end of a bleed nozzle 49. A bellows 39 is attached to the lever 37 as shown by nut 44. Attached to the bellows 39 is a tube 59 for passage of air into the bellows.

The bellows 39 is operated by air from an air supply pipe 43. Air from this supply pipe enters metering apparatus 45 and a portion of this air passes through a bleed hole 61 and flows through tubing 67 and out the bleed nozzle 49. The remainder of the air entering the apparatus 45 flows around a valve ball 55 and out through tube 57 or around the valve member 53 and out to the atmosphere through an opening 58. A diaphragm member 51 separates the air flowing through the bleed hole 61 into space 52 from the air flowing around the valve member 53. The air flowing through tube 57 may flow through tube 59 into the bellows 39 or may flow through tube 41 into a recorder-controller assembly 69 for operating a process. The ball valve 55 is held at least loosely adjacent its seat by a spring member 63. The controller 69 operates in response to air pressure from tube 41 to control the flow of air from a pipe 71 through a pipe 73 to a diaphragm motor 75. This diaphragm motor 75 is attached to a valve 79 in a pipe 77. The operating air controlled by controller 69 may flow through tube 73 or tube 73A to close or to open the valve 79 as desired.

In the operation of the embodiment of my invention illustrated in Figure 1, a liquid or vapor flows in the conduit 11 in the direction indicated by the arrows. When this fluid impinges against the circular plate 21 the rod 19 causes the flex tube 23 to bend. As any increase in rate of flow of the fluid in 11 will obviously increase the force on first lever arm 21, the force is a function of the rate of flow of said flowing fluid. When the fluid is flowing in the pipe 11 in the direction indicated by the arrows, the upper end of the flex tube 23 tends to bend from right to left and the flange 65 of the nut 31 pushes against element 44. This force pushing from right to left against element 44 tends to move the lever 37 from right to left and to collapse the bellows 39. As mentioned hereinbefore, this lever element 37 hinges around a point defined by the springs 40 and 42 in such a manner that the end of the lever 37 adjacent the bolt and lock nut 35 tends to move in the arc of a circle. When this end of the lever 37 so moves, the baffle 47 is allowed to move closer to the bleed nozzle 49 and thereby further restrict the flow of air therethrough. As mentioned hereinbefore air from a source, not shown, is supplied through the tube 43 into the air metering assembly 45. A portion of this air passes through bleed hole 61 and through the tube 67 and to the bleed nozzle 49. Upon restricting the flow of air through this bleed nozzle 49 pressure builds up in the space 52 between the diaphragm 51 and the side of the apparatus 45 to which tube 67 is attached. An increase in pressure in this space 52 tends to push the diaphragm from right to left and this movement of the diaphragm tends to close the valve 53. When valve 53 moves toward its seat the flow of air around this valve and to atmosphere is restricted. This restriction of air flow causes an increase in air pressure in the space 54 and an increase in air pressure tube 57, tube 59 and in the bellows 39. When the air pressure in bellows 39 increases the bellows tends to expand and to move the lever 37 from left to right, to move the flange 65 and nut 31 from left to right, and to move the flow plate 21 back to its original position. This increase of air pressure in tube 57 and tube 59 is also exerted through tube 41 to the controller 69 to operate the motor valve 79.

When the rate of fluid flow against the circular plate 21 is small there is little force exerted against the flow plate and the flange 65 pushes only slightly against push element 44. In this manner the lower end of lever 37 by way of the adjuster bolt 35 tends to hold the baffle 47 at least some distance away from the end of bleed nozzle 49. In this manner air pressure bleeds rather freely through the nozzle 49. When air from the apparatus 45 bleeds through nozzle 49 the pressure in the space 52 is decreased and diaphragm 51 tends to move from left to right. In this manner the valve 53 also moves from left to right to permit the flow of a larger volume of air around this valve. This movement of valve 53 permits the valve 55 to approach nearer to its seat and to restrict the flow of air from space 54 through tube 57. In this manner the bellows 39 may contract to some extent. This decrease of pressure in the tube 57 is transmitted through tube 41 to operate the controller 69.

Figure 2 of the drawing illustrates my invention as applied to a pipe having a greater diameter than the pipe illustrated in Figure 1. A plug member 83 is disposed in a side extension member 85 in the same manner as the corresponding member 17 of Figure 1. To adapt my invention to a pipe 11' provided with a flange 13' of larger size I am able to use the same flexure apparatus 24 in the embodiment of Figure 2 as was used with the smaller diameter pipe 11 of Figure 1. The bottom ends of flexure assemblies 24 of both Figures 1 and 2 are seen to be the same distance from the center lines of pipes 11 and 11', respectively. Any point for reference may be taken on the flexure apparatus 24 provided the same point is used as a reference point when the apparatus 24 is installed into a small diameter pipe or a large diameter pipe. For illustration of this principle I have used the bottom end 26 of the flexure apparatus 24 which is beveled and seats tightly against the beveled section of the wall of conduit 20. In place of taking this point as a reference point with respect to the axis of the pipe 11 or the axis of the larger diameter pipe 11' of Figure 2 I may take the top surface of the plug member 17 of Figure 1 and the top surface of plug member 83 of Figure 2, or any other corresponding reference points.

By constructing the plug members 17 and 83 of different lengths for use in pipes of different diameters I am able to use the flex member 24 in different sized pipes without any recalibration whatever.

Another advantage of my invention is that the flexure apparatus is threaded into a plug member in such a manner that when it is desired to change the flexure member 24 or to install a larger size or smaller size flow plate 21, I am able to make such a change merely by unbolting the plug members 17 or 83 and removing that small portion of the apparatus from the body of the meter. Upon removal of this element the flow plate 21 may be detached and a new plate attached to the rod 19. The plug 17 or 83 may then be rebolted into place. When conventional apparatus is used it is necessary to unbolt the flanges 13, of Figures 1 or 13' of Figure 2 and remove the entire section of apparatus from its operating position and reach manually into the pipe section 11 or 11' to remove the flow plate 21 and install a new one. Then the entire assembly is bolted by flanges 13, or 13' back into the section of pipe from which it was removed. Thus it is obvious that by the use of my particular design of plug member 17, of Figure 1, I am able to make such a change without removal of the entire T section apparatus identified by reference numerals 11, 13 and 15 from a pipe in which the fluid flow is being measured. I am also able to use a flexure member 24 in several different sizes of pipe without having to calibrate the instrument each time it is used in a pipe of different size.

As mentioned hereinbefore my apparatus is adaptable to the measurement of the flow of such heavy residua, as fuel oil and the like. My apparatus is also adaptable to the measurement of flow of such materials as catalyst slurry, propane wax mixtures, liquid containing suspended solids, and such relatively heavy materials as phenols, which are used in solvent extraction operations. My apparatus can also be used in the measurement of the flow of natural gas, refinery gases and such gases which are termed wet gases, that is those containing condensible hydrocarbons. While I have shown, for illustrative purposes, the flow of fluid in one pipe as controlling fluid flow in another pipe, my apparatus may be utilized to control other process conditions, as temperature, pressure, etc.

While certain embodiments of the invention have been described for illustrative purposes, the invention obviously is not limited thereto.

I claim:

1. A flow responsive pressure transmitter, comprising a rigid pipe having a passage adapted for the flow of a first fluid therethrough, said pipe having a side opening in its wall, and means for transmitting a pressure which is a direct function of the velocity of said flow of said first fluid in said passage comprising an elongated resilient flexible cantilever tube, means securing one end of said tube in fluid tight cantilever supporting relationship to said pipe around said side opening, a lever means comprising a first lever arm extending into said first fluid in said passage and disposed therein to pass said first flowing fluid therearound, said first lever arm thereby being affected by a force which is a function of the rate of flow of said flowing fluid, said first lever arm being secured to the other end of said tube in a fluid tight cantilever supported relationship, and a second lever arm secured to said first lever arm and extending into the atmosphere, said second lever arm being disposed and adapted to transmit said pressure, a first fluid motor having relatively movable portions, one portion being biased by fluid pressure therein to directly follow the movement of and transmit pressure to said second lever arm and the other portion being secured to said pipe, a source of a second fluid under constant pressure, a bleed nozzle mounted on said pipe, means comprising said second lever arm being disposed in its movement to variably restrict flow out of said nozzle solely in accordance with the movement of said second lever arm, means forming a restricted orifice, a first supply conduit connecting said source through said restricted orifice to said nozzle, a second conduit connected to said first fluid motor disposed and adapted to transmit the pressure therein to a distance, valve means including a passage selectively connectible with said source or the atmosphere, a third supply conduit connecting said second conduit with said passage, and means responsive to pressure in said first supply conduit between said orifice and said nozzle to selectively position said valve means to balance the forces on said first lever arm.

2. The combination of claim 1 in which the first lever arm is provided with a disc secured thereto and disposed transversely in said passage, said disc being disposed to restrict but to pass the flow of said first flowing fluid through said passage.

3. The combination of claim 2 in which the means securing one end of said tube in fluid tight cantilever supporting relationship to said pipe around said side opening includes a plug member having a passageway and a seat around said passageway, said end of said tube being secured in fluid tight cantilever supporting relationship around said passageway to said seat, said plug being secured in rigid fluid tight relationship to said pipe in said side opening, the proportions of said plug being such that said disc is centered in said passage in said pipe.

References Cited in the file of this patent

UNITED STATES PATENTS

| | | |
|---|---|---|
| 1,581,957 | Keller | Apr. 20, 1926 |
| 2,024,521 | Gent | Dec. 17, 1935 |
| 2,539,892 | Cook | Jan. 30, 1951 |
| 2,628,499 | Kleiss | Feb. 17, 1953 |
| 2,632,329 | Zuehlke | Mar. 24, 1953 |